(12) United States Patent
Hance

(10) Patent No.: US 11,871,723 B2
(45) Date of Patent: Jan. 16, 2024

(54) PET HOUSE WITH CLIMATE CONTROL

(71) Applicant: Shellie Hance, Rohnert Park, CA (US)

(72) Inventor: Shellie Hance, Rohnert Park, CA (US)

(*) Notice: Subject to any disclaimer, the term of this patent is extended or adjusted under 35 U.S.C. 154(b) by 92 days.

(21) Appl. No.: 17/521,957

(22) Filed: Nov. 9, 2021

(65) Prior Publication Data

US 2023/0145415 A1 May 11, 2023

(51) Int. Cl.
*A01K 1/00* (2006.01)
*A01K 1/035* (2006.01)

(52) U.S. Cl.
CPC ............ *A01K 1/0076* (2013.01); *A01K 1/035* (2013.01)

(58) Field of Classification Search
CPC ...... A01K 1/0076; A01K 1/035; A01K 1/033; A01K 1/034; A01K 1/00
USPC .......................................................... 119/452
See application file for complete search history.

(56) References Cited

U.S. PATENT DOCUMENTS

| | | | | |
|---|---|---|---|---|
| 4,334,501 A * | 6/1982 | McDaniel | ............... | A01K 1/033 119/482 |
| 4,831,766 A * | 5/1989 | Giglietti | ................ | A01M 23/18 43/60 |
| 5,324,462 A * | 6/1994 | Rohn | ....................... | B29C 51/04 264/278 |
| 6,234,116 B1 * | 5/2001 | Havener | ................ | A01K 1/033 119/482 |
| 6,647,924 B1 * | 11/2003 | Zwicker | ................ | A01K 1/033 119/482 |
| 7,243,614 B1 * | 7/2007 | Byers | ................... | A01K 1/0052 119/493 |
| 7,322,314 B1 * | 1/2008 | Sweeney | ................ | A01K 1/032 119/483 |
| 8,689,739 B2 * | 4/2014 | Owens | ..................... | A01K 1/03 119/455 |
| 2004/0149236 A1 * | 8/2004 | Slone | ..................... | A01K 1/033 119/482 |
| 2005/0211192 A1 * | 9/2005 | Nilforushan | .............. | A61F 7/02 119/850 |
| 2006/0071519 A1 * | 4/2006 | Heide | .................... | A01K 1/035 297/219.1 |

(Continued)

OTHER PUBLICATIONS

Kaytee Igloo Mini downloaded from https://www.amazon.com/Kaytee-100079167-Igloo-Hideout-Mini/dp/B0002AS5KU/ref=sr_1_59?keywords=hamster+hut&qid=1638798180&sr=8-59 last retrieved on Dec. 6, 2021 (11 total pages).

(Continued)

*Primary Examiner* — Brady W Frazier
*Assistant Examiner* — Zoe Tam Tran
(74) *Attorney, Agent, or Firm* — Wilmer Cutler Pickering Hale and Dorr LLP

(57) ABSTRACT

A pet house comprising an enclosure including at least one wall and a ceiling, the enclosure having an interior surface and an exterior surface, the interior surface defining an interior chamber, the at least one wall defining a door, the door providing access to the interior chamber from outside the pet house. The pet house further comprises a first layer of fabric bonded to the enclosure and covering the exterior surface. The pet house further comprises a second layer of fabric bonded to the first layer of fabric. The first layer of fabric and the second layer of fabric define a pocket between the first and second layers of fabric, the pocket being proximal to the ceiling, the pocket being sized to removably receive a temperature adjusting unit.

20 Claims, 12 Drawing Sheets

(56) References Cited

U.S. PATENT DOCUMENTS

2008/0236510 A1* 10/2008 Silverman .............. A01K 31/08
  206/509
2014/0202395 A1* 7/2014 Cantwell .............. A01K 1/0245
  119/474
2018/0002939 A1* 1/2018 Harve .................... E04H 15/48

OTHER PUBLICATIONS

Kaytee Woodland Get-A-Way downloaded from https://www.amazon.com/Kaytee-Woodland-Medium-Hamster-House/dp/B0009WH8ZE/ref=sr_1_9?keywords=hamster%2Bhut&qid=1638821787&sr=8-9&th=1 last retrieved on Dec. 6, 2021 (22 total pages).

* cited by examiner

PET HOUSE WITH CLIMATE CONTROL

FIELD OF THE INVENTION

The present innovation relates to pet houses. More particularly, the present innovation relates to pet houses with climate control and methods of providing climate control for a pet house.

BACKGROUND

Various types of pet houses have been designed to provide suitable shelters for pets, e.g., dog houses. Despite the use of such shelters for decades, a need remains for improved pet shelters that can provide an environment in which pets can stay healthy, comfortable, and happy. Certain climate factors such as temperature and humidity may significantly affect the well-being of pets. For example, a hamster can get overheated during a hot summer day and such overheating is unhealthy. A cold winter day can also be unhealthy for a hamster. Because humans can withstand a greater range of temperatures than some pets, e.g., hamsters, a need remains for providing improved climate control to pets even when they live in the same home as their human owners. As an example, whereas humans can and often do live in homes without air conditioning, living in such a home can be problematic for animals sensitive to overheating. Similarly, whereas humans often live in homes that can have cold or drafty spots during winter, being exposed to such cold drafts can be unhealthy for some pets. A need therefore remains for providing improved climate control for pets.

SUMMARY

The present disclosure is directed at pet houses with climate control. A pet house can comprise an enclosure including at least one wall and a ceiling, the enclosure having an interior surface and an exterior surface, the interior surface defining an interior chamber, the at least one wall defining a door, the door providing access to the interior chamber from outside the pet house. The pet house can comprise a first layer of fabric bonded to the enclosure and covering the exterior surface, and a second layer of fabric bonded to the first layer of fabric. The first layer of fabric and the second layer of fabric can define a pocket between the first and second layers of fabric, the pocket being proximal to the ceiling, the pocket being sized to removably receive a temperature adjusting unit.

BRIEF DESCRIPTION OF THE DRAWINGS

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

DETAILED DESCRIPTION

In the following description, numerous specific details are set forth regarding the structures, systems, and methods of the disclosed subject matter and the environment in which such structures, systems, and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other structures, systems, and methods that are within the scope of the disclosed subject matter.

The disclosed structures, systems, and methods can provide climate control to one or more pets, so that the one or more pets can stay comfortable despite undesirable climate conditions. A pet house with climate control according to the invention can provide cooling to help prevent a pet from becoming overheated. The pet house with climate control according to the invention can also provide heating to help a pet stay warm during cold days.

Figure 1A:
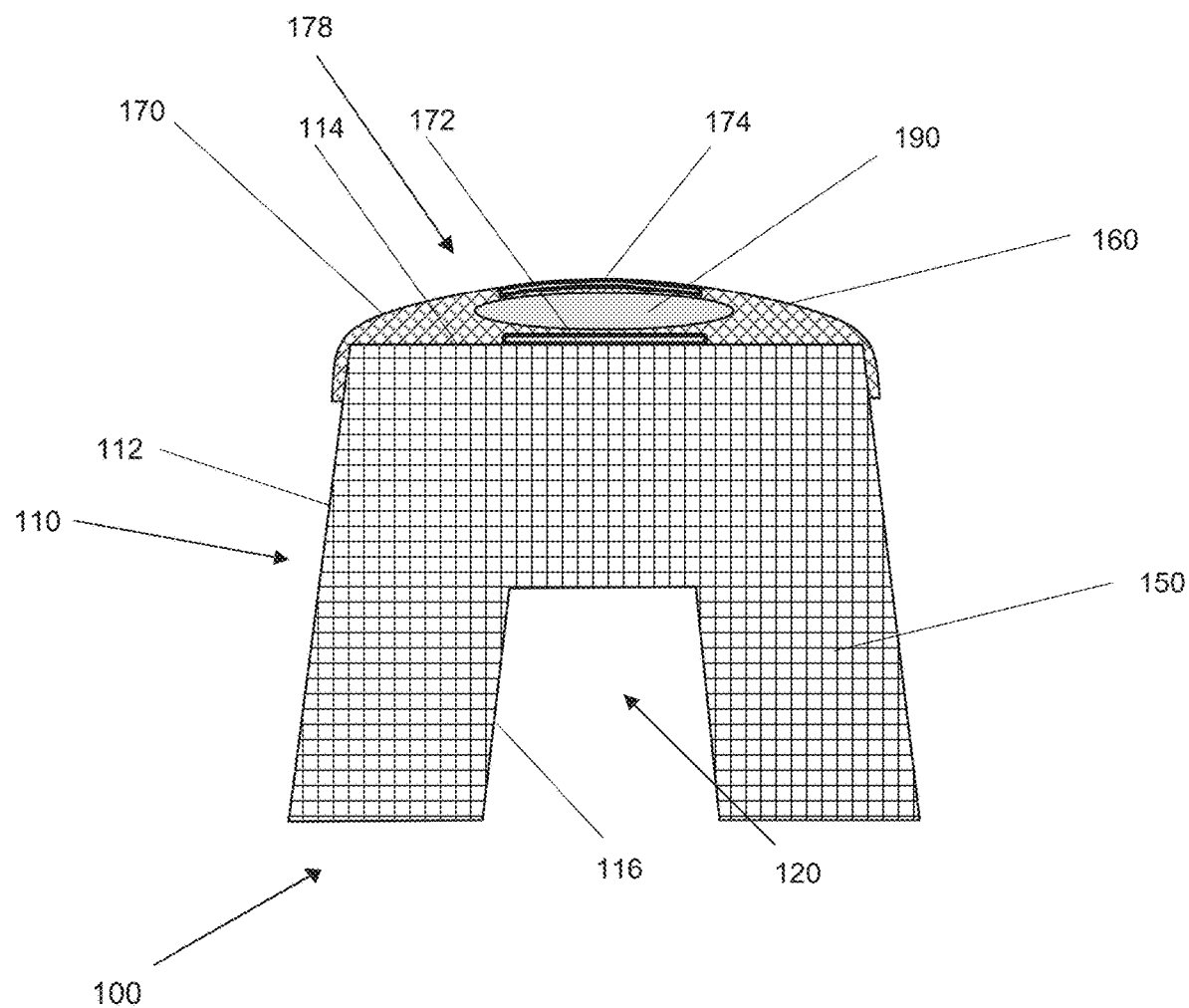
FIG. 1A shows a front view of a pet house constructed according to the invention, when a pocket of the pet house is open.
Figure 1B:
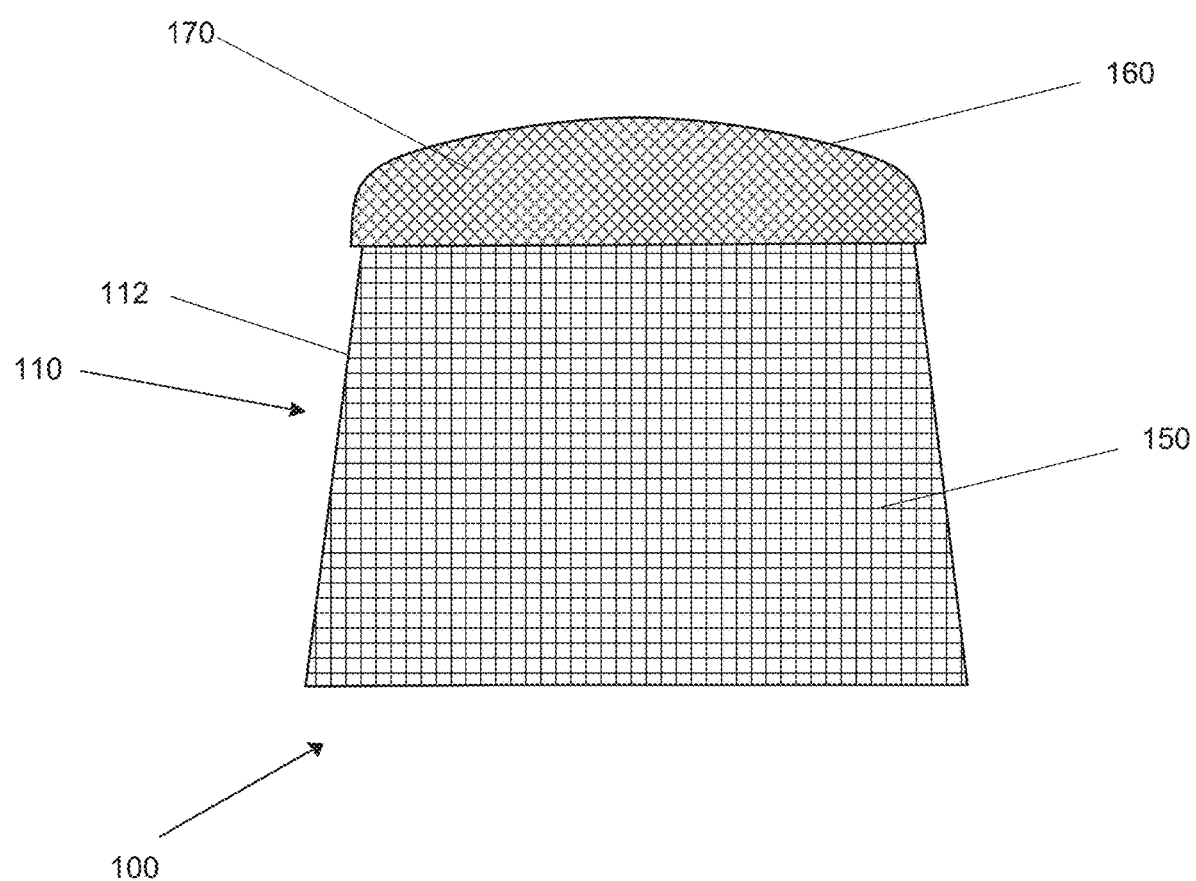
FIG. 1B shows a rear view of the pet house shown in FIG. 1A.
Figure 1C:
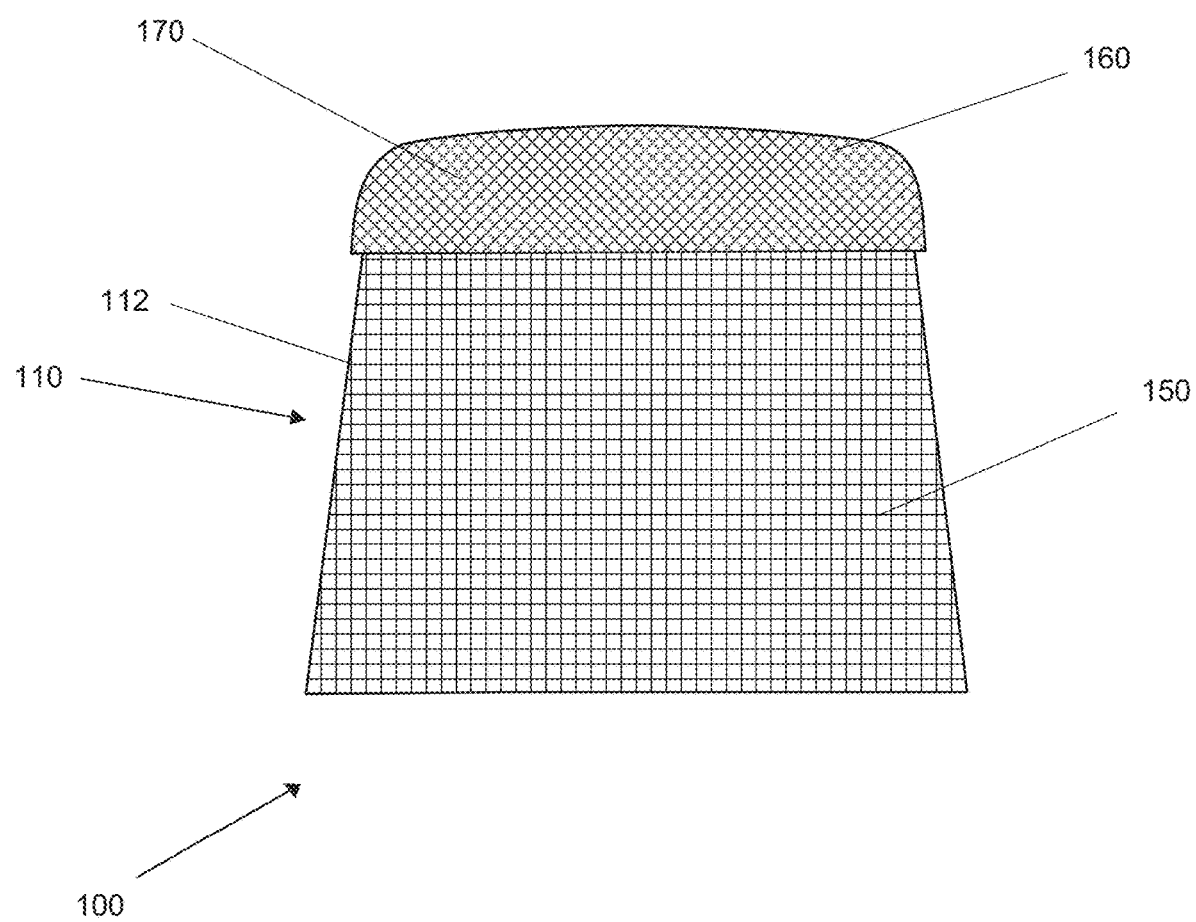
FIG. 1C shows a side view of the pet house shown in FIG. 1A.
Figure 1D:
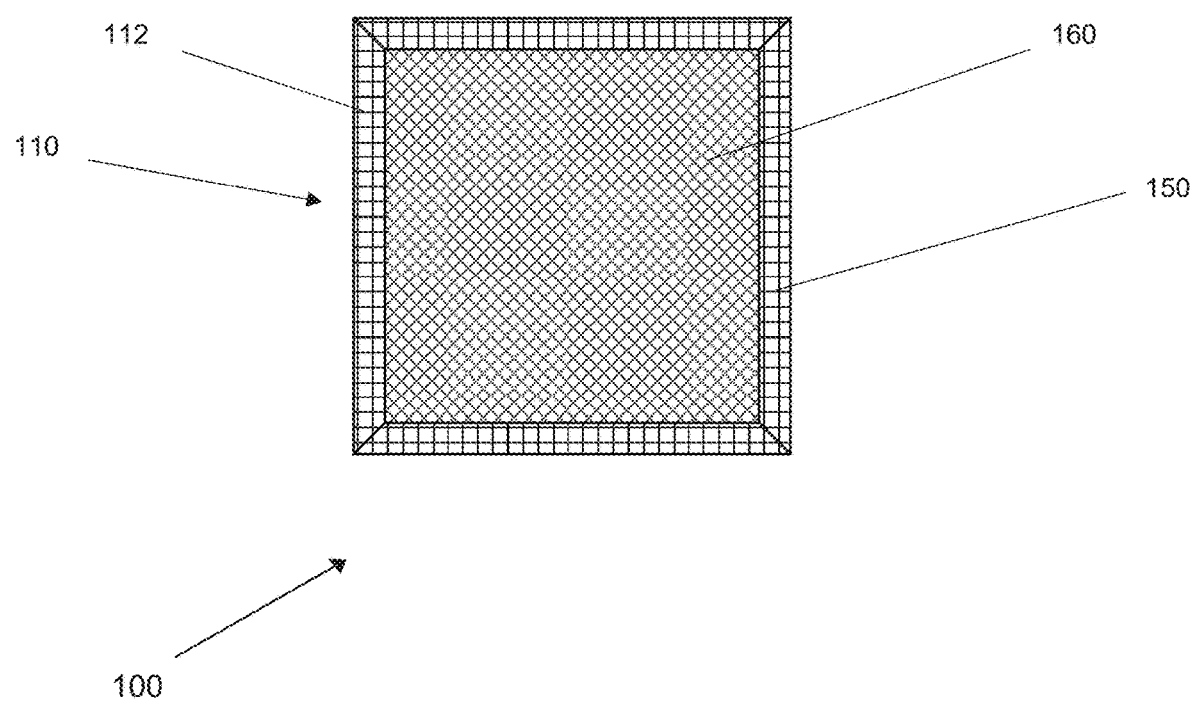
FIG. 1D shows a top view of the pet house shown in FIG. 1A.
Figure 1E:
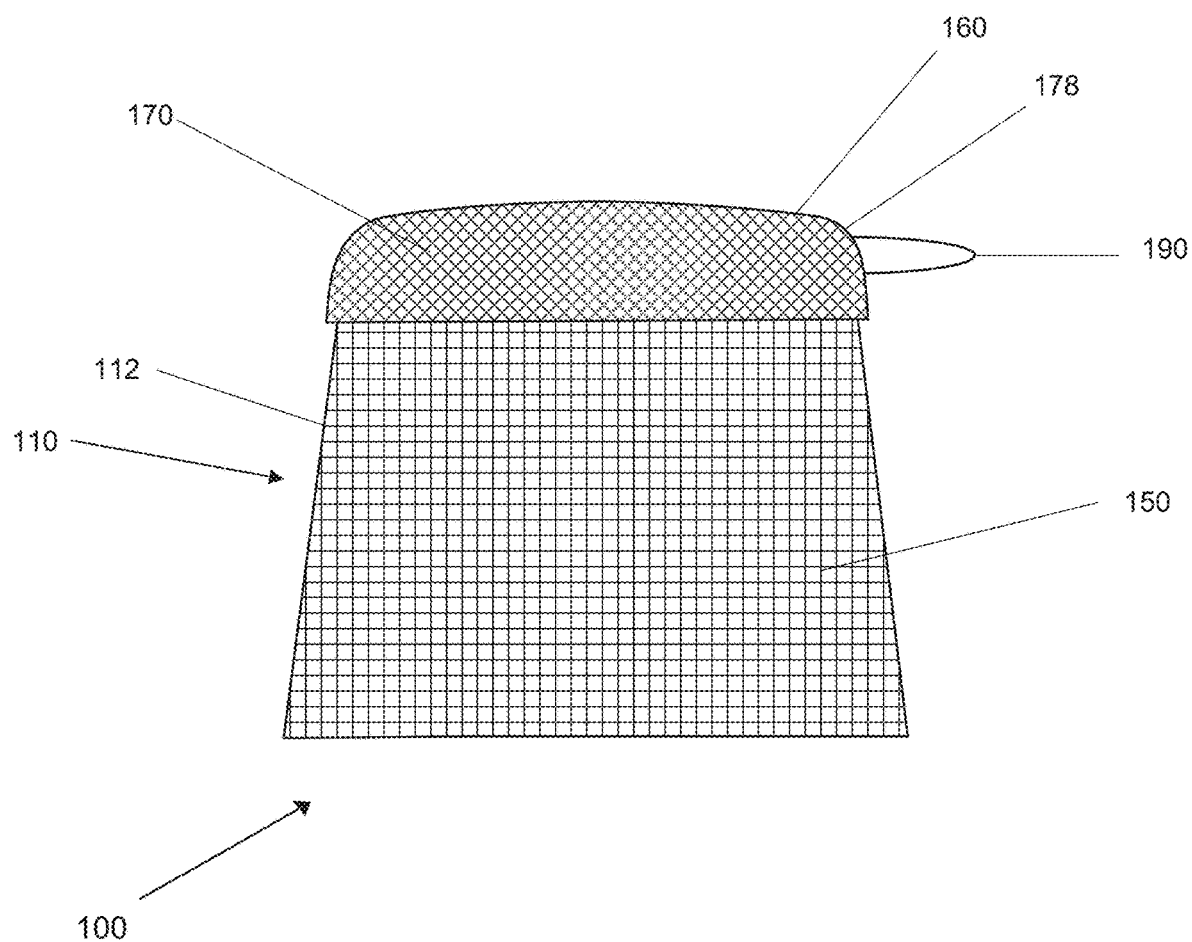
FIG. 1E shows a side view of the pet house shown in FIG. 1A during insertion of a temperature adjusting unit into the pocket.
Figure 1F:
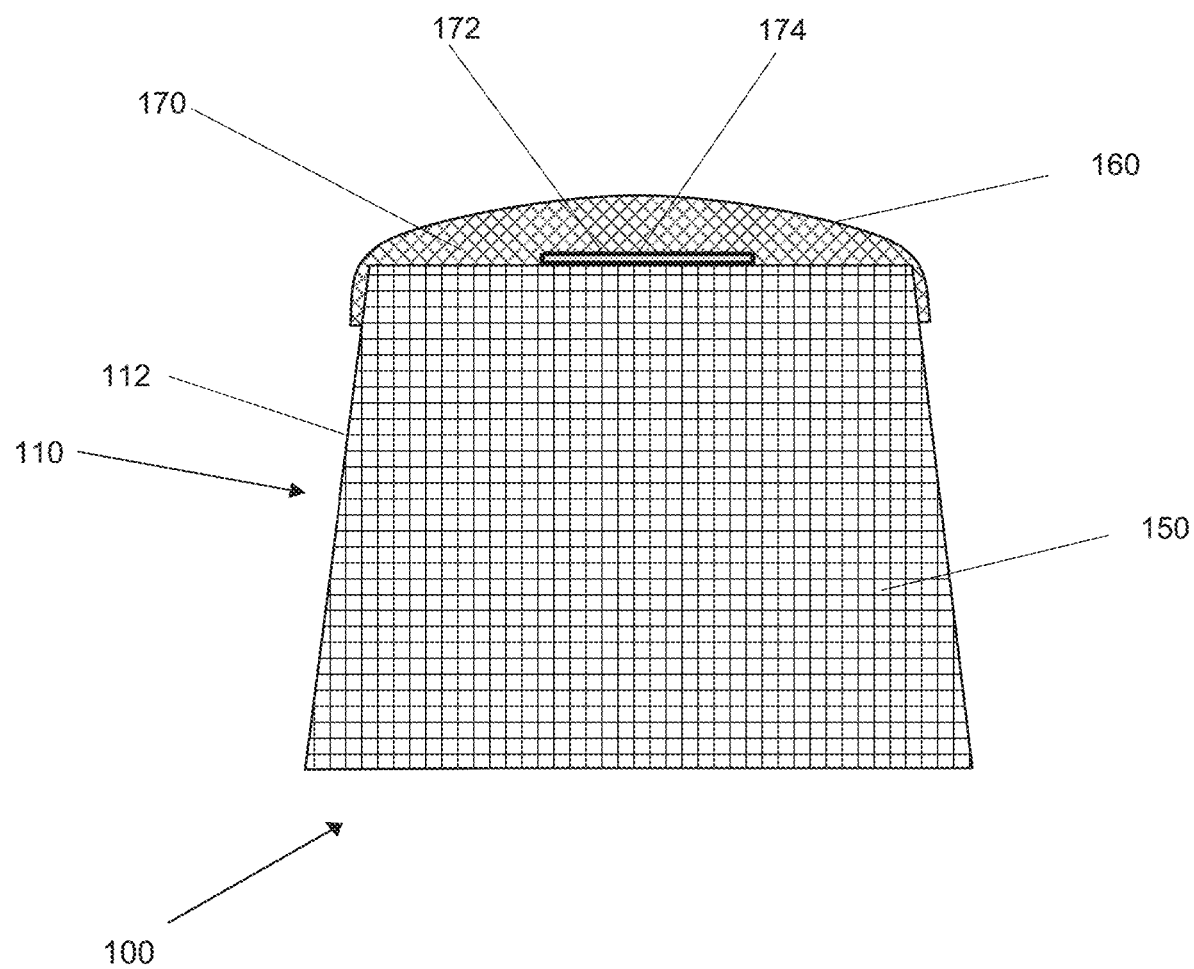
FIG. 1F shows a front view of the pet house shown in FIG. 1A when the pocket is sealed.
Figure 2A:
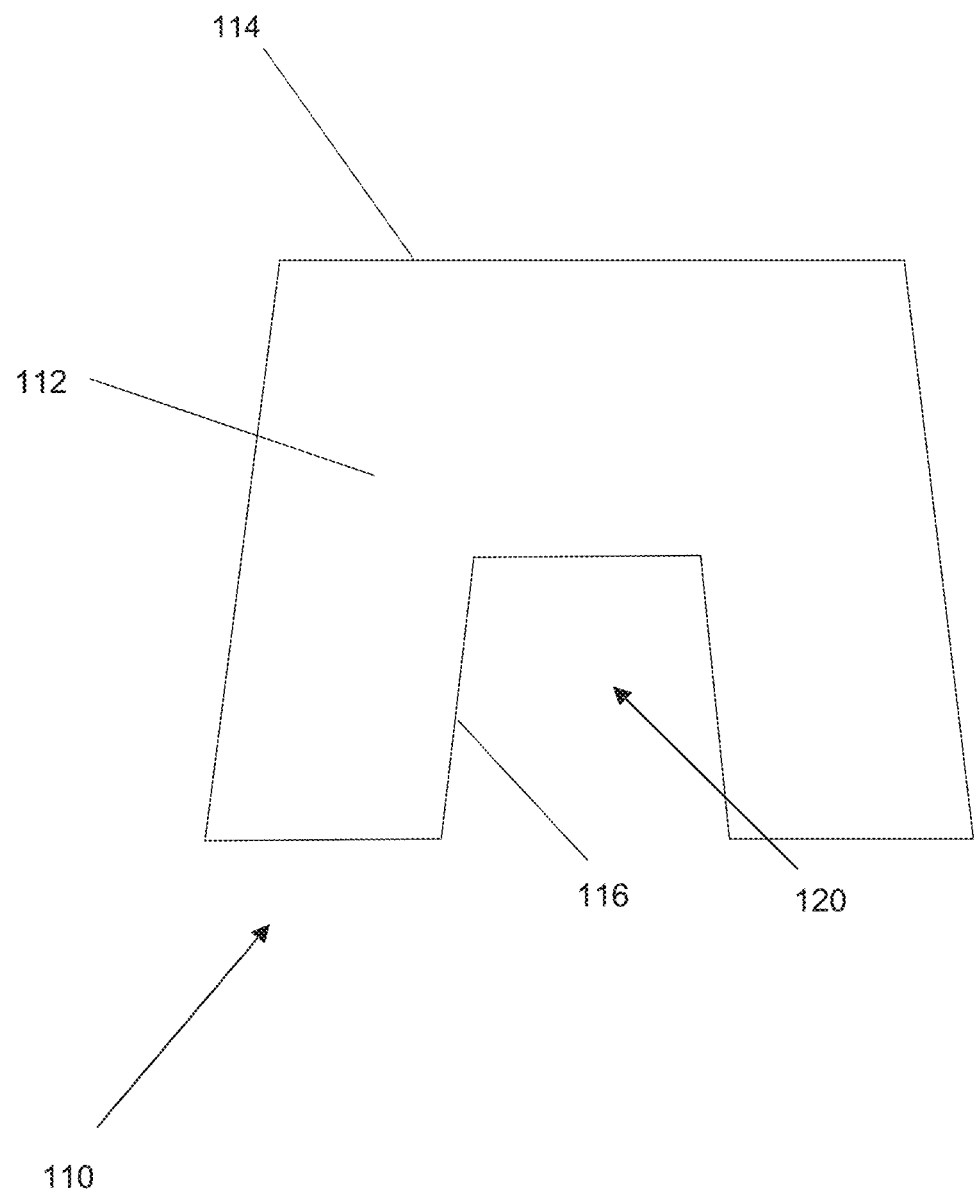
FIG. 2A shows a front view of an enclosure of the pet house of FIGS. 1A-1F constructed according to the invention.
Figure 2B:
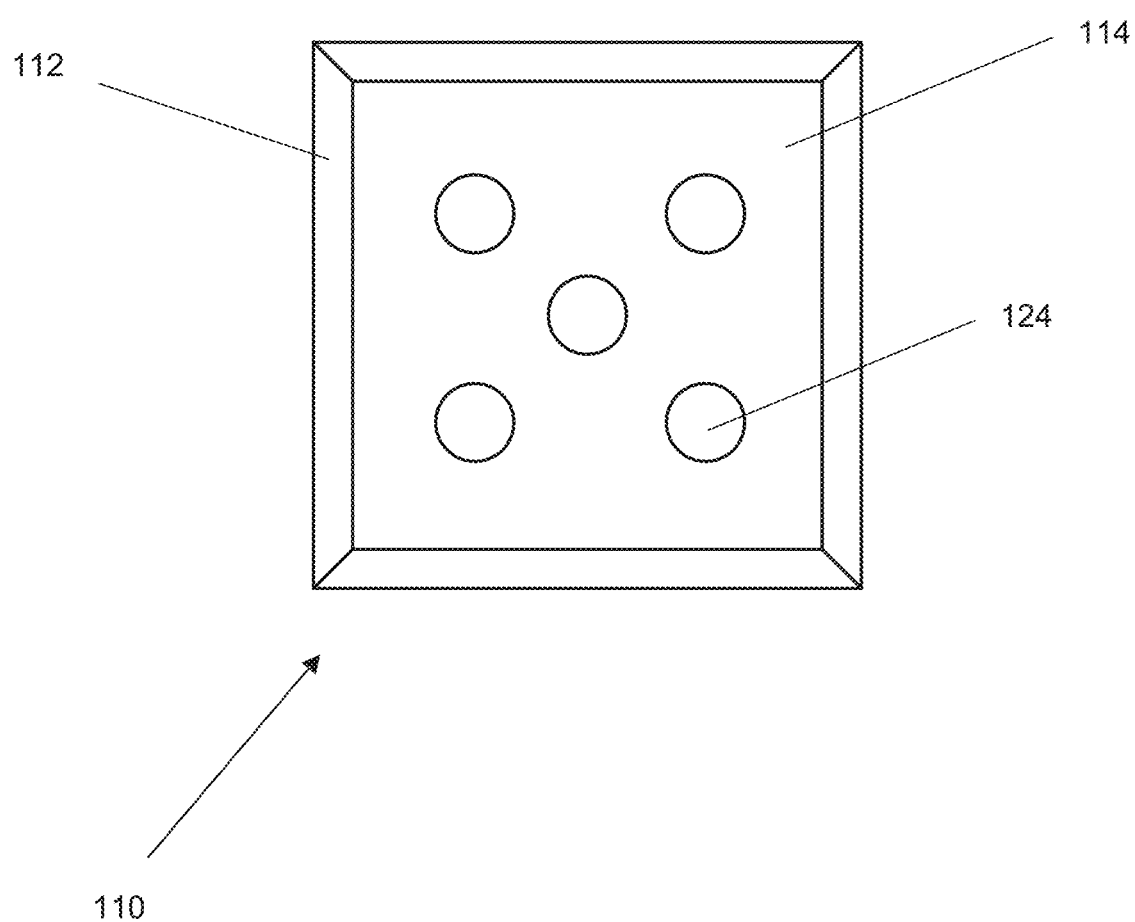
FIG. 2B shows a top view of the enclosure shown in FIG. 2A.

FIGS. 1A-1F show a pet house 100 constructed in accordance with the invention. As explained herein, pet house 100 is constructed by attaching fabric to an enclosure. FIG. 2A shows a front view of such an enclosure 110, which defines a vertical wall 112, a ceiling 114, a door 116, and an interior chamber 120. FIG. 2B shows a top view of enclosure 110. As shown in FIG. 2B, ceiling 114 preferably contains holes 124. As explained herein, holes 124 allow evaporation from interior chamber 120 and help prevent chamber 120 from becoming or remaining damp.

Returning to FIG. 2A, interior chamber 120 is bounded by wall 112 and ceiling 114. Pet house 100 preferably has no floor, but it can also include a floor. Preferably, enclosure 110 is made from a single piece of plastic. While enclosure 110 is preferably made from a single piece of plastic, other forms of construction may be used and are embraced within the invention. For example, enclosure 110 may be fabricated from five separate pieces of wood that are fixed together, e.g., by screws and/or adhesive. In such an embodiment, each of four vertical walls is formed by a single piece of wood and another piece of wood is used to form the ceiling 114. In the embodiment illustrated in FIGS. 2A-2B, wall 112 is a single wall, formed from a single piece of plastic, that extends around all four sides of the rectangular or square enclosure 110. However, other shapes of pet house 100 are embraced within the invention, e.g., circular or oval shapes. Also, while FIG. 2A shows a single door 116, additional doors may also be provided. In one preferred embodiment, enclosure 110 is formed from a plastic food storage container with the door 116 and ceiling holes 124 being cut from the container.

The enclosure 110 preferably has an area of no more than 50 square inches, but it can also have a larger area. The enclosure 110 preferably has a height of no more than 6 inches, e.g., 4 inches, but it can also have a larger height. In the embodiment illustrated in FIGS. 2A-2B, the enclosure 110 generally has a cuboidal shape with a square bottom slightly larger than a square top. Preferably, four sides of the square bottom of the enclosure 110 each range from 5 to 7 inches, e.g., 6 inches in length. The door 116 preferably has a width of no more than 2.5 inches and a height of no more than 3 inches, but it can also have a larger size. In a preferred embodiment, the door 116 is sized for admittance of a pet hamster and has a width of 2 inches and a height of 2 inches.

Returning to FIG. 1A, pet house 100 is constructed by attaching a first layer of fabric 150 to the enclosure 110. The first layer of fabric 150 preferably covers all exterior surfaces of enclosure 110. The first layer of fabric 150 may also be wrapped around the bottom edge of wall 112 and the edge of door 116 so that the first layer of fabric 150 also covers at least a portion of the interior surface of enclosure 110. First layer of fabric 150 may be attached to enclosure 110 by adhesive, e.g., glue, or by other means, e.g., screws, tacks or other fasteners.

After the first layer of fabric 150 has been attached to enclosure 110, a second layer of fabric 160 is attached to the first layer of fabric 150. As shown in FIG. 1A, the second layer of fabric 160 extends over the ceiling 114 (i.e., over the portion of the first layer of fabric 150 that covers the ceiling 114) and an upper portion of the exterior surface of wall 112 (i.e., over the portion of first layer of fabric 150 that covers an upper portion of the exterior surface of wall 112). In other embodiments, the second layer of fabric 160 can cover additional parts (e.g., by extending lower down wall 112) of the first layer of fabric 150. The second layer of fabric 160 is preferably attached to the first layer of fabric 150, e.g., by an adhesive such as glue. However, other techniques, e.g., tacks or screws, may be used for fixing the second layer of fabric 160 to the first layer of fabric 150.

Figure 3A:
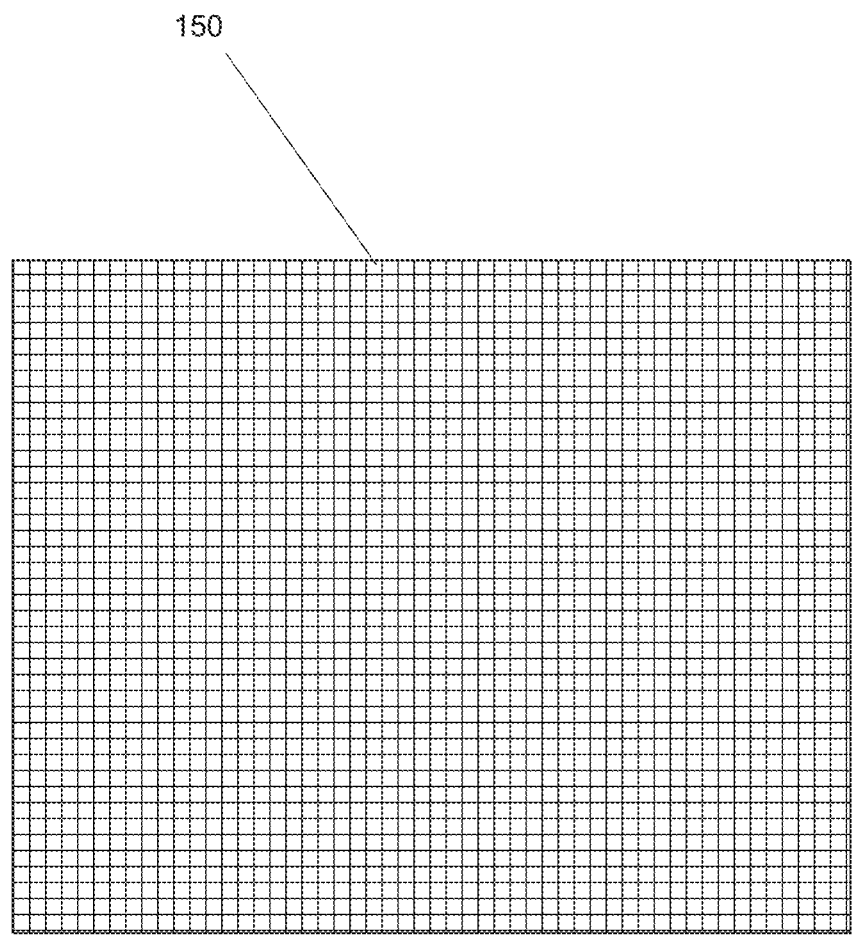
FIG. 3A shows a top view of a ceiling of the pet house after the ceiling has been covered by a first layer of fabric.
Figure 3B:
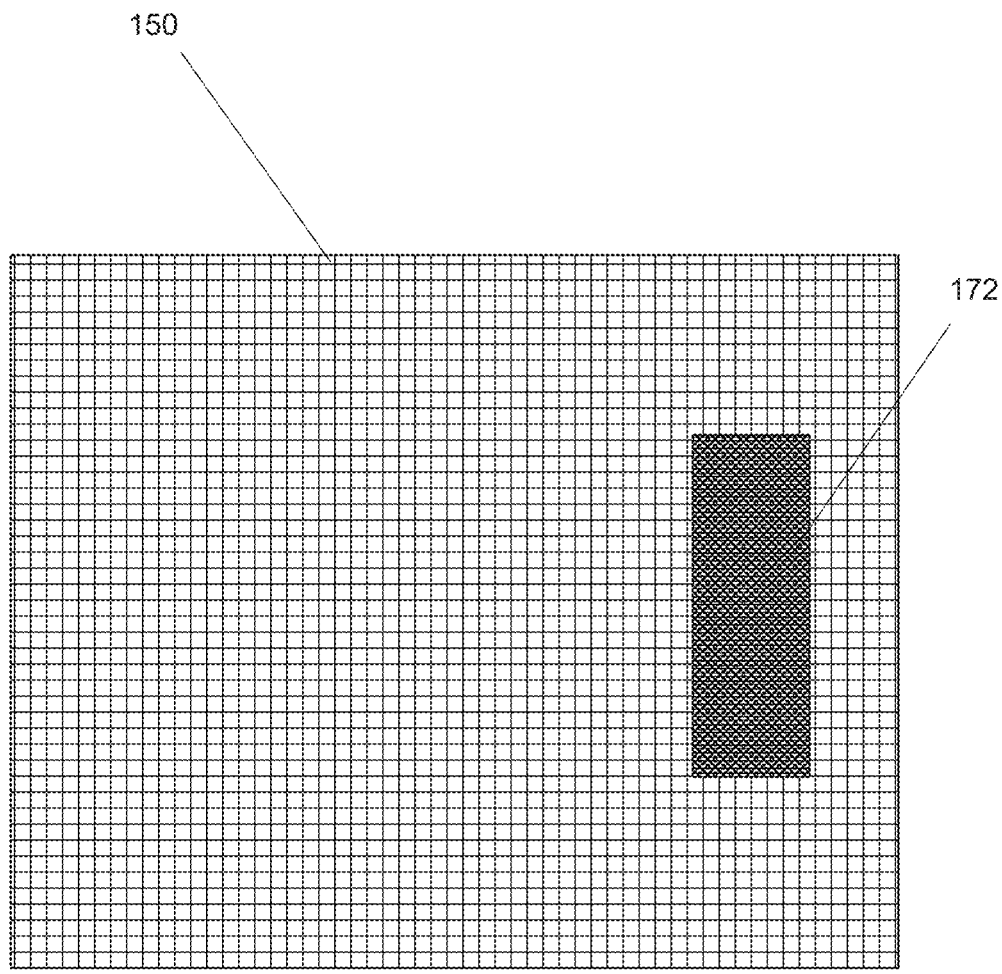
FIG. 3B shows a top view of the ceiling after a first fastener portion (e.g., a hook side or a loop side of a hook-and-loop seal) has been attached to the first layer of fabric shown in FIG. 3A.
Figure 3C:
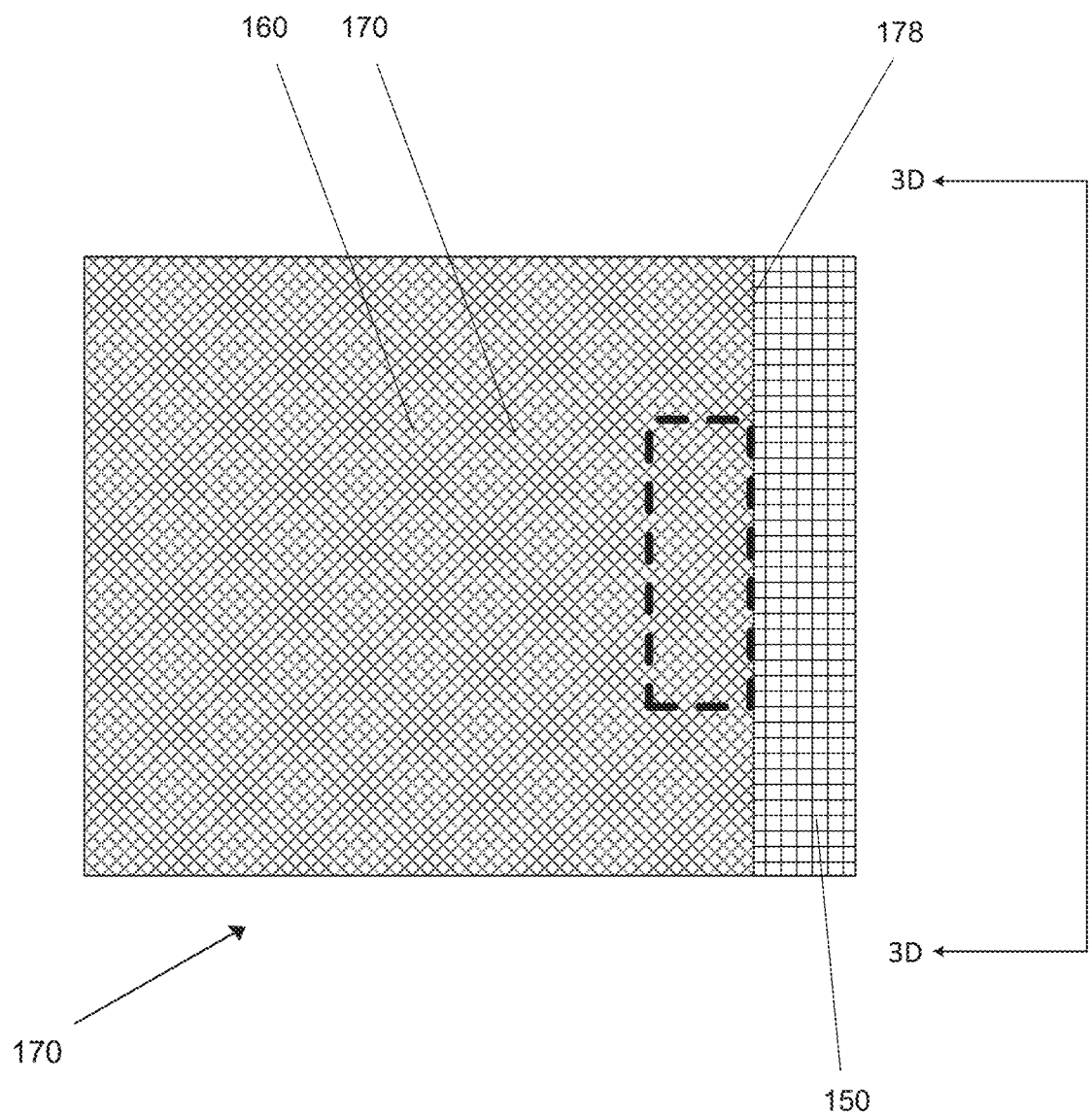
FIG. 3C shows a top view of the ceiling after a second layer of fabric has been added to the configuration shown in FIG. 3B.
Figure 3D:
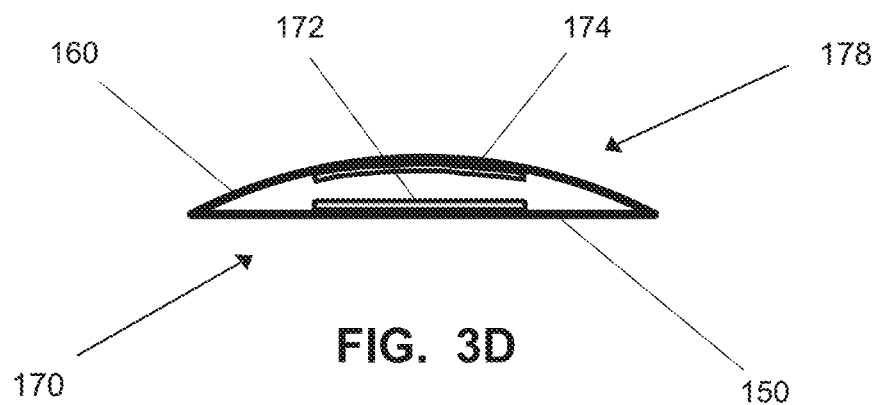
FIG. 3D is a front view of the first and second layers of fabric when the pocket is open, taken from the direction indicated by arrow 3D-3D in FIG. 3C.
Figure 3E:
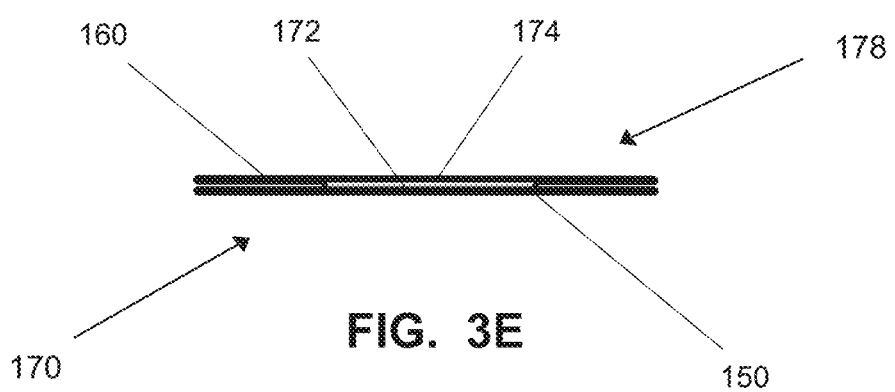
FIG. 3E is a front view of the first and second layers of fabric when the pocket is empty and closed.
Figure 3F:
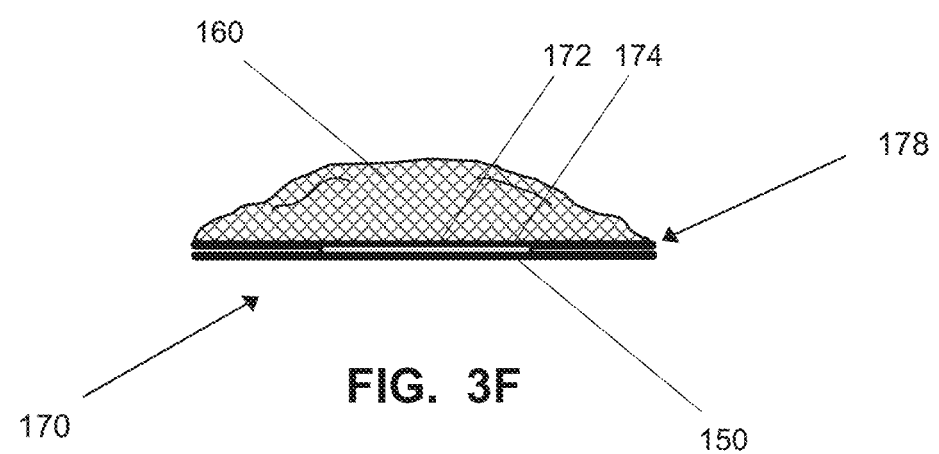
FIG. 3F is a front view of the first and second layers of fabric when the pocket contains a temperature adjusting unit and the pocket is closed.

FIGS. 3D-3F show front views of the portion of the first and second layers of fabric, 150 and 160, that cover the ceiling 114. As shown in FIG. 3D, the first and second layers of fabric, 150 and 160, define a pocket 170. FIG. 3D shows the pocket when it is open. FIG. 3E shows the first and second layers of fabric, 150 and 160, when the pocket 170 is both empty and closed. In this condition, the second layer of fabric 160 contacts the first layer of fabric 150 over most, if not the entire, ceiling 114. FIG. 3F shows the first and second layers of fabric, 150 and 160, when a temperature adjusting unit 190 has been inserted into the pocket 170 and the pocket 170 has been closed. FIG. 1E shows a side view of pet house 100 when temperature adjusting unit 190 is being inserted into the pocket 170.

Returning to FIG. 3D, a first fastener portion 172 is attached to a portion of the first layer of fabric 150 and a second fastener portion 174 is attached to a portion of the second layer of fabric 160. The first and second fastener portions, 172 and 174, are preferably hook-and-loop type fasteners (e.g., of the type commercially known as VELCRO®). The first fastener portion 172 may comprise loops and the second fastener portion 174 may comprise the hooks, or vice versa. Also, while hook-and-loop type fasteners are preferred, other mechanisms, e.g., zippers or buttons, may be used for the first and second fastener portions 172 and 174. The purpose of the fastener portions 172 and 174 is to allow for easy opening and closing of pocket 170.

FIGS. 3A-3C illustrate a procedure for forming the pocket 170. As shown in FIG. 3A, initially the first layer of fabric 150 is attached to the ceiling 114 (and although not illustrated in FIG. 3A, also to other exterior surfaces of enclosure 110). As shown in FIG. 3B, next the first fastener portion 172 is attached to the first layer of fabric 150, e.g., by using glue. Next, as shown in FIG. 3C, the second layer of fabric 160 is attached to the first layer of fabric 150. As shown in FIG. 3C, the second layer of fabric 160 need not cover the entire ceiling 114 and rather a strip of the first layer of fabric 150 may be left exposed. In the embodiment illustrated in FIG. 3C, the pocket 170 has a rectangular shape. However, other shapes of pocket 170 are embraced within the invention, e.g., a half-moon shape. As shown in FIG. 3C, the second layer of fabric 160 stops short of covering the entire ceiling 114 at edge 178. Edge 178 in turn defines the edge of the pocket 170, which may be opened and closed so as to insert or remove a temperature adjusting unit 190.

While FIG. 3C illustrates a preferred embodiment, the second layer of fabric 160 may cover the entire ceiling 114. In such embodiments, the edge 178 of the pocket may be co-extensive with an edge of the ceiling 114 or, alternatively, the edge 178 of the pocket may be located on the external surface of wall 112.

Temperature adjusting unit 190, e.g., as shown in FIG. 1E, may be implemented using a heating/cooling pack. Such packs are commercially available, e.g., as gel packs, and may be heated, e.g., in a microwave oven, or cooled, e.g., in a freezer or refrigerator. In operation, on a hot day, the temperature adjusting unit 190 may be cooled, e.g., in a freezer, and then inserted into the pocket 170. Conversely, on a cold day, the temperature adjusting unit 190 may be heated, e.g., in a microwave oven, and then placed in the pocket 170. In this way, the interior chamber 120 (e.g., as shown in FIG. 1A), may be cooled or heated, as desired, to create a more desirable environment for a pet. The holes 124 (e.g., as shown in FIG. 2B) in ceiling 114 prevent condensation and allow any moisture to conveniently evaporate from interior chamber 120 so as to keep the chamber 120 comfortable and dry.

Pet house 100 is preferably sized to fit within larger pet environments, e.g., terrariums. Experience with one hamster reveals that the hamster enters the pet house 100 to cool off on hot days once a cool temperature adjusting unit 190 has been inserted into the pocket 170. Similarly, experience with that hamster reveals that the hamster enters the pet house 100 to warm up on cool days once a hot temperature adjusting unit 190 has been inserted into the pocket. Pets also enjoy climbing the walls 112 of pet house 100 and resting on the ceiling 114. An advantage of covering the exterior walls 112 of enclosure 110 with fabric is that pets can conveniently climb the walls 112 to reach the ceiling 114. In addition to providing a thermally controlled chamber 120, pet house 100 also provides pets with shelter, e.g., an area in which they can retreat to and feel safe within. Preferably, pet house 100 has only one door 116 so as to enhance the sense of safety a pet feels when inside chamber 120. However, additional doors may be included.

It is to be understood that the disclosed subject matter is not limited in its application to the details of construction and to the arrangements of the components set forth in the description or illustrated in the drawings. The disclosed subject matter is capable of other embodiments and of being practiced and carried out in various ways. Also, it is to be understood that the phraseology and terminology employed herein are for the purpose of description and should not be regarded as limiting.

The invention claimed is:

1. A pet house comprising:
    an enclosure including at least four walls and a ceiling, the enclosure having an interior surface and an exterior surface, the interior surface defining an interior chamber, at least one wall defining a door, and the door providing access to the interior chamber from outside the pet house;
    a first layer of fabric bonded to the enclosure and covering the exterior surface; and
    a second layer of fabric disposed on the first layer of fabric over at least a portion of the ceiling and over at least a portion of each of three of the four walls adjacent to the ceiling, the second layer of fabric bonded to the first layer of fabric over the portion of each of the three walls adjacent to the ceiling, the first layer of fabric and the second layer of fabric defining a pocket between the first and second layers of fabric, the pocket being proximal to the ceiling, the pocket having an opening where the second layer of fabric is not bonded to the first layer of fabric, the pocket being sized to removably receive a temperature adjusting unit that is a source of heating or cooling in the interior chamber.

2. The pet house according to claim 1, wherein the temperature adjusting unit is a heating/cooling pack, wherein the heating/cooling pack is configured to:
    perform a cooling operation after being chilled and placed in the pocket; and
    perform a heating operation after being heated and placed in the pocket.

3. The pet house according to claim 1, wherein the door has a width of no more than 2.5 inches and a height of no more than 3 inches.

4. The pet house according to claim 1, the door being sized for admittance of a pet hamster.

5. The pet house according to claim 1, the first layer of fabric being wrapped around a bottom edge of the enclosure and bonded to the interior surface.

6. The pet house according to claim 1, wherein the pocket has a rectangular shape and stops short of covering the entire ceiling at an edge, the edge providing access to an interior of the pocket.

7. The pet house according to claim 6, further comprising a sealing mechanism for closing the edge.

8. The pet house according to claim 7, wherein the sealing mechanism is a hook-and-loop fastener.

9. The pet house according to claim 1, wherein the ceiling defines at least one hole located below the pocket so the temperature adjusting unit is a source of heating or cooling in the interior camber through the pocket and at least one hole in the ceiling below the pocket.

10. The pet house according to claim 1, wherein the enclosure has an area of no more than 50 square inches and a height of no more than 6 inches.

11. The pet house according to claim 1, wherein the enclosure has a cuboidal shape with bottom edges each ranging in length from 5 to 7 inches and a height ranging from 3 to 5 inches.

12. The pet house according to claim 1, wherein the wall is made of plastic.

13. A method of providing climate control to a pet, comprising:
    providing an enclosure including at least four walls and a ceiling, the enclosure having an interior surface and an exterior surface, the interior surface defining an interior chamber, at least one wall defining a door, and the door providing access to the interior chamber from outside the pet house;
    providing a first layer of fabric bonded to the enclosure and covering the exterior surface;
    providing a second layer of fabric disposed on the first layer of fabric over at least a portion of the ceiling and over at least a portion of each of three of the four walls adjacent to the ceiling, the second layer of fabric bonded to the first layer of fabric over the portion of each of the three walls adjacent to the ceiling, the first layer of fabric and the second layer of fabric defining a pocket between the first and second layers of fabric, the pocket being proximal to the ceiling, the pocket having an opening where the second layer of fabric is not bonded to the first layer of fabric, the pocket being sized to removably receive a temperature adjusting unit that is a source of heating or cooling in the interior chamber;
    heating or cooling the temperature adjusting unit to a desired temperature; and
    inserting the temperature adjusting unit into the pocket.

14. The method according to claim 13, wherein the step of providing the enclosure further includes the step of forming the door with a width of no more than 2.5 inches and a height of no more than 3 inches.

15. The method according to claim 13, wherein the step of providing the first layer of fabric further includes providing the first layer of fabric wrapped around a bottom edge of the enclosure and bonded to the interior surface.

16. The method according to claim 13, wherein the step of providing a second layer of fabric further includes the step of forming the pocket with a rectangular shape that stops short of covering the entire ceiling at an edge, the temperature adjusting unit being a heating/cooling pack, the edge providing access for inserting the heating/cooling pack into the pocket.

17. The method according to claim 16, further including the step of closing the edge by a sealing mechanism after inserting the heating/cooling pack into the pocket.

18. The method according to claim 13, wherein the step of providing the enclosure further includes the step of forming at least one hole defined by the ceiling, the at least one hole being located below the pocket so the temperature adjusting unit is a source of heating or cooling in the interior camber through the pocket and at least one hole in the ceiling below the pocket.

19. The method according to claim 13, wherein the step of providing the enclosure further includes the step of providing the enclosure with an area of no more than 50 square inches and a height of no more than 6 inches.

20. The method according to claim 13, wherein the step of providing the wall further includes the step of providing the wall made of plastic.

\* \* \* \* \*